May 22, 1951 R. H. LONG 2,554,304
TRANSMISSION OPERATING MECHANISM
Filed Oct. 28, 1947 7 Sheets-Sheet 3

INVENTOR.
RICHARD H. LONG.
BY H. O. Clayton
ATTORNEY

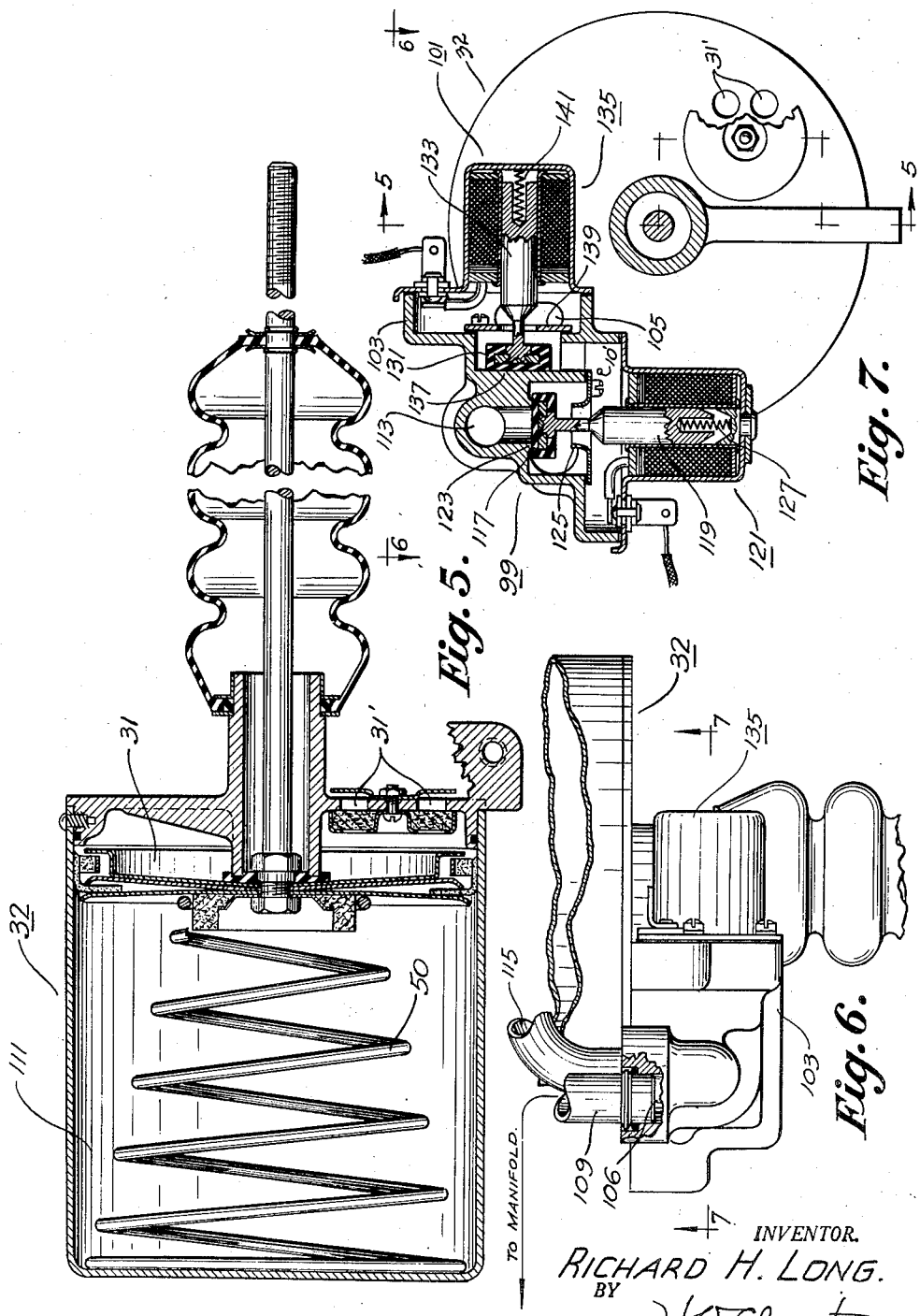

May 22, 1951  R. H. LONG  2,554,304
TRANSMISSION OPERATING MECHANISM
Filed Oct. 28, 1947  7 Sheets-Sheet 5

Inventor
RICHARD H. LONG.
H.O. Clayton
ATTORNEY

May 22, 1951     R. H. LONG     2,554,304

TRANSMISSION OPERATING MECHANISM

Filed Oct. 28, 1947     7 Sheets-Sheet 6

INVENTOR
RICHARD H. LONG
BY
H.O. Clayton
ATTORNEY

May 22, 1951 R. H. LONG 2,554,304
TRANSMISSION OPERATING MECHANISM
Filed Oct. 28, 1947 7 Sheets-Sheet 7

INVENTOR
RICHARD H. LONG
BY H. O. Clayton
ATTORNEY

Patented May 22, 1951

2,554,304

UNITED STATES PATENT OFFICE 2,554,304

TRANSMISSION OPERATING MECHANISM

Richard H. Long, South Bend, Ind., assignor to Bendix Aviation Corporation, South Bend, Ind., a corporation of Delaware Application October 28, 1947, Serial No. 782,498

11 Claims. (Cl. 192—.092)

This invention relates in general to the power transmission mechanism of the power plant of an automotive vehicle and in particular to power and manually operated means for operating the change speed transmission of said power plant and for operating the throttle and the friction clutch to facilitate the operation of the transmission.

One of the objects of my invention is to provide, in an automotive vehicle including a fluid coupling and a three speeds forward and reverse transmission, a simple mechanism, power operated in part, for operating said transmission, all of the settings thereof being effected by a manual operation of said mechanism if the driver desires to so operate the mechanism, and the second and high gear settings of the transmission and the operation of the throttle and friction clutch to facilitate said settings, being effected by power means if the driver elects this operation of the mechanism.

A further object of my invention is to provide, in an automotive vehicle including a fluid coupling, an accelerator, a friction clutch, an engine controlling throttle, a three speeds forward and reverse transmission, and a gear shift lever, means for operating and for facilitating the operation of said transmission, said means including power means, comprising two separate pressure differential operated motors one of which is automatically operable, when the gear shift lever is placed in a certain position and after the accelerator is released, to establish the transmission either in its second gear setting or its high gear setting depending upon the speed of the vehicle, the friction clutch and the throttle being operated by the other of said motors to facilitate this operation of the transmission, said means further including manually operated means for effecting any one of the gear settings of the transmission.

Another object of my invention is to provide, in an automotive vehicle including a power plant comprising a fluid coupling, a friction clutch, a gear shift lever, an engine controlling throttle, a vehicle speed responsive governor and a three speeds forward and reverse change speed transmission, manually and power operated mechanism for operating the transmission the latter being power operated to alternately effect the second and high gear setting thereof the throttle and clutch being operated to facilitate said operations of the transmission, said mechanism including a double acting pressure differential operated motor operably connected to the transmission and a single acting pressure differential operated motor operably connected to the clutch and throttle, said motors being operative, in one cycle of operations, to disengage the clutch, the throttle being held closed during said operation, then operate the transmission to establish one or the other of the aforementioned two settings, then re-engage the clutch in a plurality of stages of operation; and one of the principal objects of my invention is to include in said mechanism a simple electrical means operative, with certain operations of switches operated by the gear shift lever, the governor, the accelerator, and one of the motors, to initiate and complete the aforementioned cycle of operations of said motors.

Yet another object of my invention to include, in the aforementioned electrical means, relay mechanism cooperating with the remainder of the electrical means to provide an effective electrical control of the aforementioned motors; and yet another and important object of my invention is to include, in the aforementioned electrical controls, means selectively operable at the will of the driver and when the vehicle is travelling above governor speed, for effecting a second gear setting of the transmission and thereby overruling the operation of the governor of the mechanism, said mechanism being also operative to maintain said second gear setting.

An important object of my invention is to provide, in the power plant of an automotive vehicle, power means for shuttling the change speed transmission of the vehicle back and forth between two of its settings, the throttle and friction clutch of the power plant being operated to facilitate said operation of the transmission, said power means including two separate motors, one for operating the clutch and throttle and the other for operating the transmission, the operation of the transmission and incidental operation of the throttle and clutch being effected in one cycle of operations.

The above and other objects and features of the invention will appear more fully hereinafter from a consideration of the following description taken in connection with the accompanying drawings wherein three embodiments of the invention are illustrated by way of example.

Figure 5 is a sectional view, taken on the line 5—5 of Figure 7, disclosing details of the clutch and throttle operating pressure differential operated motor of my invention;

Figure 6 is a view, partly in section and taken on the line 6—6 of Figure 7, disclosing details of the air transmitting ducts constituting part of the motor unit disclosed in Figures 5 and 7;

Figure 7 is a view, largely in section, disclosing details of the solenoid operated valves for controlling the operation of the motor unit in Figure 5;

Figure 1:
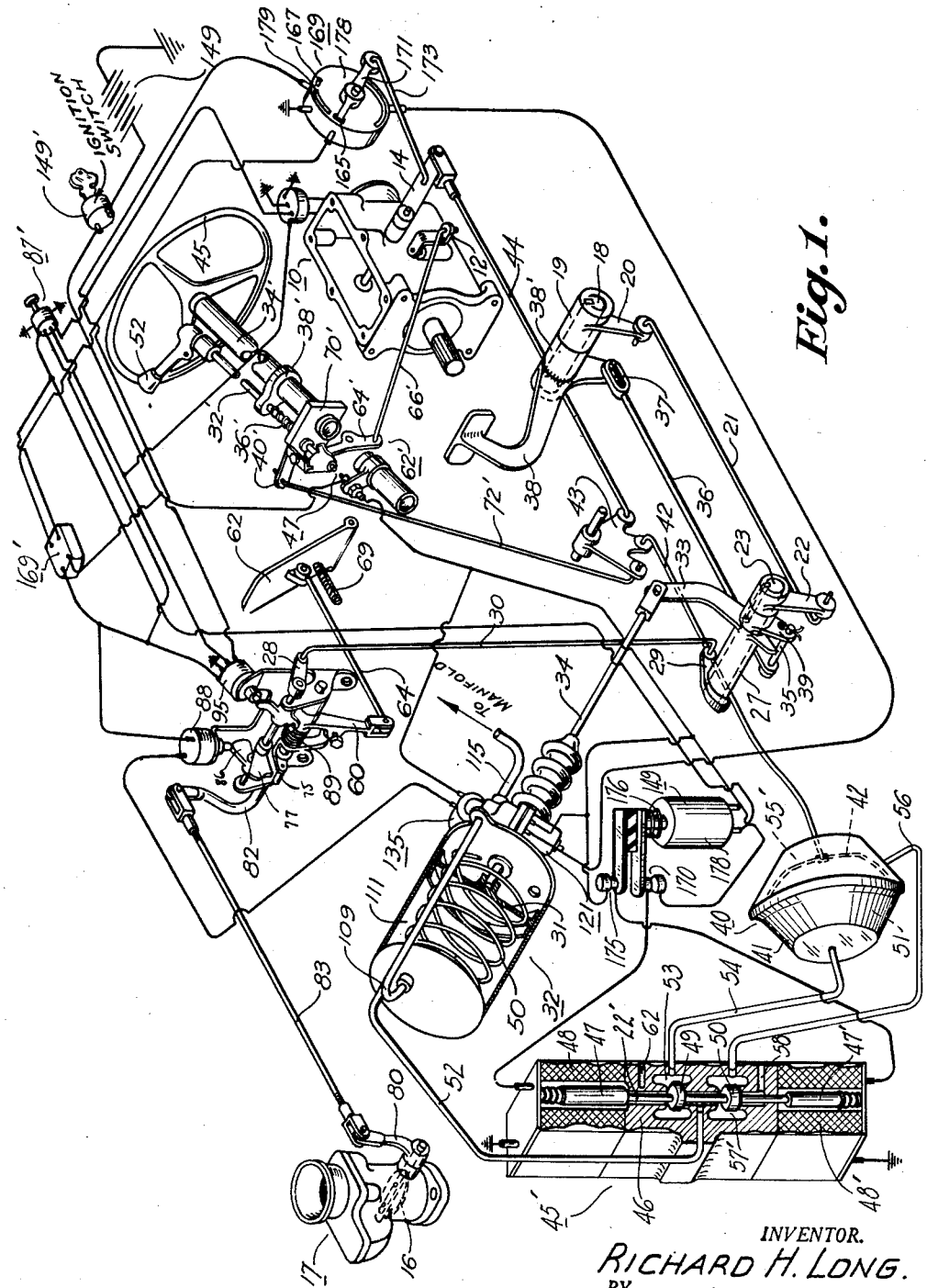
Figure 1 is a diagrammatic view of my invention disclosing the principal features thereof.

Referring now to Figure 1 disclosing a preferred embodiment of my invention, a three speeds forward and reverse transmission 10 of any well known make is operated by means of a manually operated crank 12 and a manually and power operated crank 14, the crank 12 serving to operate the shift rail selecting mechanism of the transmission and the crank 14 serving to operate that part of the transmission functioning to move the selected rail to establish the transmission in the desired gear ratio. With such a transmission the crank 14 must be moved to its transmission neutral position to neutralize the transmission before the shift rail selecting crank 12 may be operated.

My invention has to do with the manually and power operated means for actuating the aforementioned transmission operating cranks 12 and 14, for operating the engine throttle valve 16 of the carburetor 17, and for operating a conventional friction clutch, not shown, said clutch including the usual driving and driven plates forced into engagement by clutch springs. The aforementioned transmission and the clutch as well as the hereinafter referred to fluid coupling are of conventional design, accordingly, no claim is made thereto and the same are not disclosed in the drawings. The mechanism of my invention also preferably includes, in the power plant of the vehicle, a fluid coupling such for example as that which was incorporated in certain 1947 passenger vehicles and said coupling includes an impeller and a vaned rotor the latter serving to drive the aforementioned driving plate of the clutch.

The friction clutch, not shown, is operably connected to a clutch throw out shaft 18 to which is keyed a sleeve 19; and to crank 20, fixedly secured to said sleeve, there is pivotally connected a rod 21. The rod 21 is pivotally connected to a crank 22 which is keyed to a shaft 23. A sleeve 27 covering the shaft 23 is operably connected to a crank 28 by means of a crank 29 fixedly secured to said sleeve and a rod 30 which is pivotally connected to the cranks 28 and 29.

The sleeve 27 is operably connected to a piston 31 of a single acting clutch and throttle operating pressure differential operated motor 32, by means of a two-armed crank 33 fixedly connected to said sleeve and by means of a rod 34 pivotally connected at one of its ends to the longer arm of the crank 33 and secured at its other end to the piston. The shorter of the two arms of the crank 33 abuts a pin 35 which is preferably rotatably mounted, at one of its ends, in one end of a rod 36, said rod being connected at its other end by a lost motion connection 37, to a manually operably clutch pedal 38. This pedal constructed as a two-armed crank member, is rotatably mounted on the shaft 18 and is fixedly secured to a sleeve 38' which is also rotatably mounted on said shaft. The other end of the pin 35 is pivotally connected to a crank 39 which is keyed to the shaft 23.

There is thus provided manually and power operated means for operating the clutch, the clutch pedal 38, by virtue of the operation of the lost motion connection 37, remaining stationary when the motor 32 is energized to disengage the clutch; and the piston 31 remaining stationary when the clutch pedal is actuated to operate the clutch.

Describing now that part of the power means of my invention serving to operate the transmission, there is provided a double acting pressure differential operated motor 40 including a casing 41 and a piston 42, the latter being preferably connected to a three-armed transmission operating crank 43. As is disclosed in Figure 1, one of the arms of the crank 43 is pivotally connected to a crank 40' by a link 72' and the other two arms of the crank 43 are pivotally connected to links 42 and 44. A power operated double three-way valve 45' serves to control the operation of the motor 40, said valve including a casing 46 bored to receive a reciprocable valve member 22' extending from one end of the armature 47 of a solenoid 48. Valve members 49 and 50 are secured to the member 22' and serve to control the flow of air into and from the motor 40; and to the lower end of the valve member 22' there is secured the armature 47' of a solenoid 48'.

Briefly describing the operation of the transmission operating motor 40 and its control valve 45', when the solenoid 48 is energized, an operation which is effected as a part of the operation of establishing the transmission in high gear, the valve members 49 and 50 are moved upwardly from the positions disclosed in Figure 1, thereby connecting a control chamber 51 of the motor 40 with a chamber 111 of the motor 32 via a conduit 52, valve chambers 22' and 53 and a conduit 54. A chamber 55' of the motor 40 is at this time vented to the atmosphere via a conduit 56, a valve chamber 57' and a duct 58. When the solenoid 48' is energized to establish the transmission in its second gear setting, the armature 47' is moved downwardly to seat the valve member in the position disclosed in Figure 1 thereby venting the motor chamber 51 to the atmosphere via conduit 54, valve chamber 53 and a duct 62, and connecting the motor chamber 55' with the source of vacuum, that is, chamber 111 of motor 32, via conduit 56, valve chambers 57' and 22' and conduit 52.

Describing now that part of the mechanism of my invention which is actuated by a manually operated gear shift lever 52, Figure 1, said mechanism includes a rotatable and bodily movable shaft 32' extending alongside the steering column 34' of the vehicle. As is disclosed in Figures 1, 8 and 9, the shaft 32' is biased downwardly by a spring 36' positioned between a stop 38' mounted on the steering column and the crank 40' which is operably connected to said shaft by means of a clutch mechanism 42' described hereinafter. The shift lever 52 mounted beneath the steering wheel 45' is so connected to the shaft 32' that a rotation of said lever in a plane parallel to said wheel effects a rotation of said shaft about its longitudinal axis in the operation of either neutralizing the transmission or establishing the same in a gear setting; and this connection between the shift lever and shaft 32' is also such that the cross-shift movement of the shift lever, that is, the movement in a plane perpendicular to the plane of the steering column, results in a movement of the shaft 32' to either effect a shift rail selecting operation of the crank 12 or effect a declutching operation of the clutch 42' and a closing of a selector switch 47 to prepare the mechanism for its power operation.

Describing the aforementioned clutch mechanism 42', said mechanism includes a member 44' sleeved over the lower end of the shaft 32', said member being permanently secured in place to the crank 40'. The lower end portion of the member 44' is provided with a flange 46' which is recessed at 48', Figure 8, to provide a keyway for a key portion 50' of a spool-shaped end portion of a clutch member, said member being sleeved over and drivably connected by splines 54' to the end portion 56' of the shaft 32'. A nut 58', threaded on the end of the shaft portion 56', serves as a stop for the clutch mechanism which is biased downwardly by the operation of the spring 36'.

The upper arm 60' of a bell crank lever 62' fits within the spool-shaped portion of the clutch member 52' and a lower arm 64' of the said lever is pivotally connected, by a link 66', to the shift rail selecting crank 12. As is disclosed in Figure 8, the spring 36' serves to bias the clutch 42' and shaft 32' as a unit downwardly, the movement being limited by a stop 68', Figure 9, constituting a part of a steering column mounted bracket member 70'; and in this position of the clutch 42' the shift rail selector crank 12 is actuated to prepare the transmission for either a second gear or high gear operation, said operation of course depending upon the subsequent actuation of the shift rail operating crank 14. To actuate the crank 12 to prepare the transmission for either a low gear or reverse gear operation, that is, a selection of the low and reverse gear shift rail of the transmission, the driver lifts the shift lever 52' upwardly in a plane perpendicular to the plane of the steering wheel; and this operation serves to rotate the bell crank lever 62' in a counterclockwise direction, Figure 8, the spring 36' being compressed and the flange 46', Figure 9, being moved into engagement with the stop 68'. To actuate the shift rail operating crank 14 to neutralize the transmission or establish the same in any one of its four gear ratio settings, the driver rotates the shift lever 52' in a plane parallel to the plane of the steering wheel thereby effecting an angular movement of the crank 40' which is preferably connected to the crank 14 by force transmitting means including link 72', the aforementioned three-armed lever 43 and the link 44.

There is thus provided, by the above described mechanism, means for manually operating a three speeds forward and reverse transmission or its equivalent; and in this manual operation of the transmission the shift lever 52' is movable to five different positions, said selective movement outlining the letter H.

Figure 4:
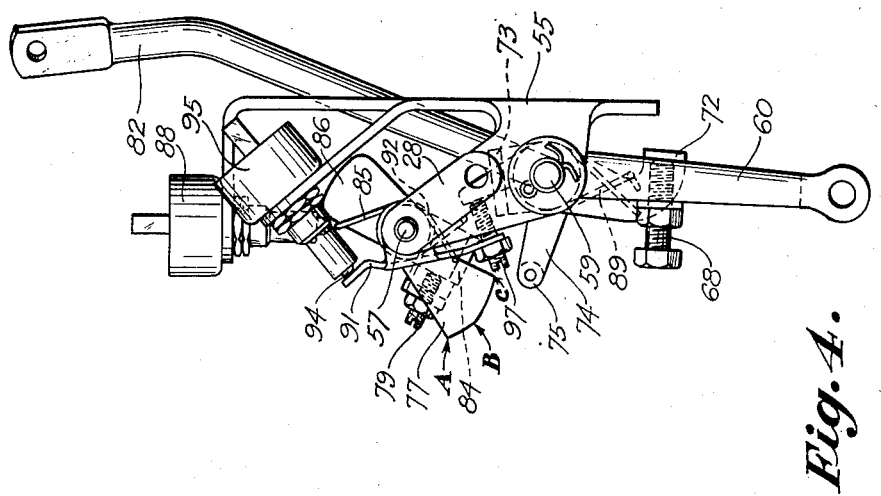
Figure 4 is a side view of the mechanism disclosed in Figure 3.
Figure 3:
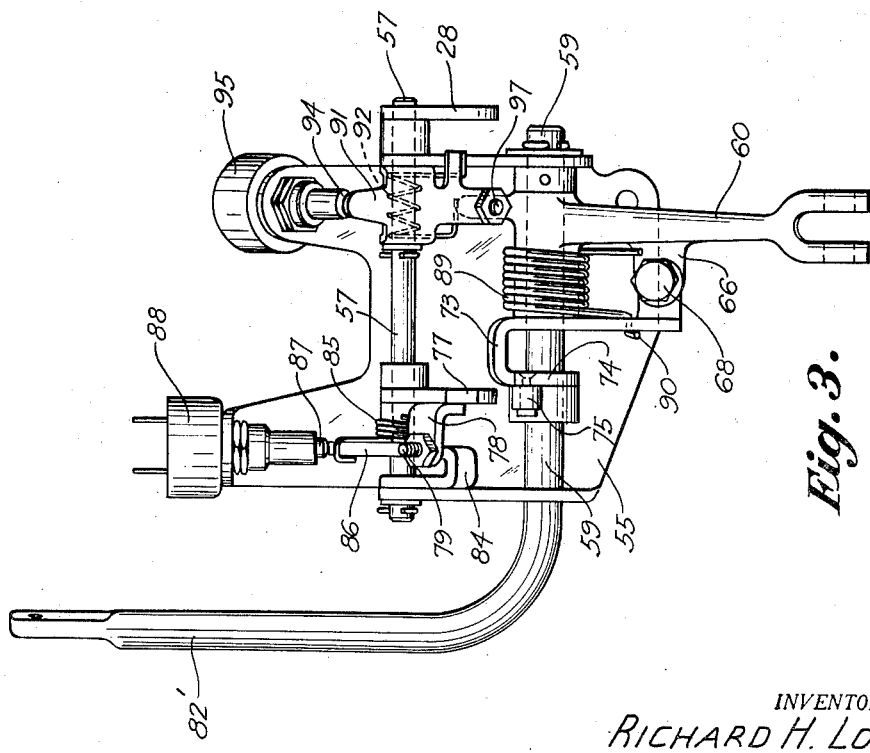
Figure 3 is a front view disclosing details of certain of the controls operated by one of the motors and also disclosing the accelerator operated switch of my invention.

Referring now to Figures 3 and 4 there is disclosed therein details of certain other controls of the mechanism disclosed in Figure 1. A support member 55 serves as a mounting for a shaft 57 and a shaft 59, said shafts being journalled in the sides of said support member. The shaft 59 is operably connected to the throttle valve 16 by cranks 80 and 82 and a link 83. A two-armed crank 60, rotatably mounted on the shaft 59 and operably connected to the accelerator 62 of the car by a link 64 is provided with a laterally extending flange 66 within which is adjustably mounted stop member 68. This stop member is biased, by the operation of an accelerator return spring 69, into engagement with a flange member 72 extending laterally from a U-shaped fitting 73 fixedly secured to the shaft 59. From the fitting 73 there extends a flange 74 which is provided at its end with a roller member 75. This roller member is contacted by a cam 77 which is fixedly mounted on the shaft 57; and mounted alongside the cam 77 there is provided a support 78 which is also fixedly mounted on the shaft 57. There is adjustably mounted in the support 78 a set screw 79 adapted at its inner end to contact a U-shaped member 84 which is rotatably mounted on the shaft 57 and which is biased clockwise into engagement with the set screw 79 by a spring 85. A cam 86, secured to the member 84, contacts a pin 87 extending from the movable contact, now shown, of a conventional breaker switch 88; and this contact is biased, by a spring, not shown, to its switch open position and is moved to its switch closed position by the spring operated cam 86 which is shaped to effect a closing of the switch during a part of the clutch engaging movement of the motor piston 31.

There is provided by the switch 88 and the cam means for operating the same, means for controlling the operation of a choke valve operating solenoid 135, Figure 7, to effect a controlled clutch engaging operation of the motor 32. The parts, including the contour of the face of the cam 86, are preferably so constructed and arranged and so operative that the solenoid 135 is energized, to move a valve member 131 away from a seat 137, during the clutch engaging movement of the piston 31 said operation being effected just as the piston reaches the point of clutch plate contact; and as stated above the parts are also so constructed and arranged and so operative that the switch 88 is subsequently opened, to effect a de-energization of the solenoid 135, during said clutch engaging movement of said piston. When the valve 131 is moved off of a seat 139, Figure 7, air rushes into the motor 32 at a relatively high rate to thereby effect a relatively rapid clutch engaging movement of the clutch driven plate, and when the valve 131 is seated air flows into the motor 32 via a relatively small opening 10'. The solenoid 135 and valve means for controlling the operation of the motor 32, are described in greater detail hereinafter.

Continuing the description of the mechanism disclosed in Figure 3 a coil spring 89, sleeved over the hub of the crank 60, is connected at one of its ends 90 to the member 73 and the other end of said spring abuts the outer face of the flange 66 on said crank. There is thus provided by the spring 89 and co-operating parts including the cam 77, means, interconnecting the accelerator and throttle whereby the accelerator may be depressed without effecting an opening of the throttle when the motor 32 is energized to successively disengage the clutch and operate the transmission; for with the first increment of clutch disengaging movement of the piston 31, the cam 77 is rotated counterclockwise, Figure 4, thereby providing, by its end portion A, B a stop to prevent a clockwise rotation, that is, throttle opening movement, of the accelerator operated flange 74. And it is to be noted at this juncture that when the accelerator is depressed to cock the spring 89 and the motor 32 is de-energized to effect a re-engagement of the clutch, the cam 77 is rotated clockwise, Figure 4, to effect a controlled opening of the throttle as the clutch plates move into contact with each other, a segment B, C of said cam being shaped to effect this operation. Preferably all points along the segment A, B of the cam 77 are equally distant from the center of rotation of said cam; and the radius of the cam from the point B to the point C progressively decreases. There is thus provided, by the operation of the sector A, B of the cam 77, a stop means operative to prevent an opening of the throttle when the clutch is being disengaged and during the engagement of the clutch as the driven clutch plate moves up to a point just short of engagement with the driving clutch plate; and the subsequent operation of the segment B, C of said cam serves to make possible a progressively increased opening of the throttle, by the operation of the accelerator loaded spring 89, as the clutch plates move into driving engagement with each other.

Completing the description of the mechanism of Figure 3, a switch operating member 91, rotatably mounted on the shaft 57, is biased, by a coil spring 92, to rotate in counterclockwise direction, Figure 4; and the lower end of the member 91 is adjustably connected to the upper arm of the two-armed crank 69 by means of a set screw 97 which is adjustably mounted on the member 91.

Figure 12:
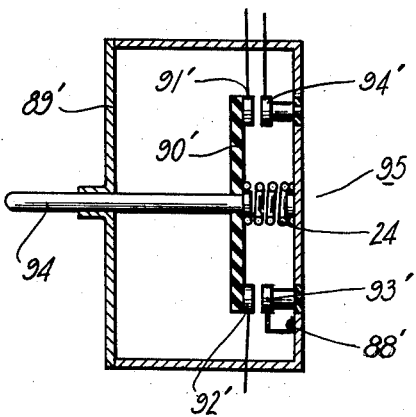
Figure 12 is a sectional view disclosing in detail the accelerator operated breaker switch mechanism of Figures 1 and 2.

The upper end of the switch operating member 91 abuts the lower end of a pin 94 which is connected to the movable contacts of a breaker switch mechanism 95 disclosed in detail in Figure 12. This accelerator operated switch mechanism includes a casing 89' housing two movable contacts 91' and 92' mounted upon a support 96' which is secured to the accelerator operated pin 94 extending from the casing. The contacts 91' and 92' are electrically connected respectively, to a fixed contact 167 of a motor operated multi-switch selector switch mechanism 169, Figures 1 and 2, and to a relay 169' including a normally open switch 163 and a coil 165'. Fixed contacts 94' and 93' mounted in the casing 89' are electrically connected, respectively, to a grounded switch 99' of a second gear overrule switch 87' and to a conductor electrically grounded at 88'.

There is thus provided by the switch mechanism 95, two separate switches 92', 93'; and 94', 91' both of which are closed when the accelerator is released and opened by a spring 24, when the accelerator is depressed. The switch 88 which is not shown in detail preferably includes a movable contact and a fixed contact, the movable contact being biased to its switch open position by a spring within the switch.

The valve means for controlling the operation of the motor 32 is disclosed in detail in Figure 7 and includes a three-way valve unit 99 and a choke valve unit 101 which includes the aforementioned valve 131. Both units are housed within a casing 103 preferably mounted on the casing of the motor 32. The casing 103 is preferably ported at 105 to provide a vent to the atmosphere, at 106 to receive a duct 109 leading to the control compartment 111 of the motor, and at 113 to receive a conduit 115 leading to the intake manifold of the internal combustion engine of the vehicle or other source of vacuum. The three-way valve unit 99 includes a valve member 117 operably connected to the armature 119 of a solenoid 121 which is secured to the casing 103. When the solenoid 121 is energized, the valve member 117 is moved downwardly, Figure 7, to leave a seat 123 and abut a seat 125; and when said solenoid is de-energized a spring 127 serves to return the valve member to its seat 123. The choke valve unit 101 includes the valve member 131 which is operably connected to the armature 133 of the solenoid 135 secured to the valve casing 103. As previously briefly described, the solenoid 135 is energized, the valve member 131 is moved off of a seat 137 onto a seat 139; and when the solenoid 135 is de-energized a spring 141 serves to return the valve member 131 to its seat 137.

Figure 2:
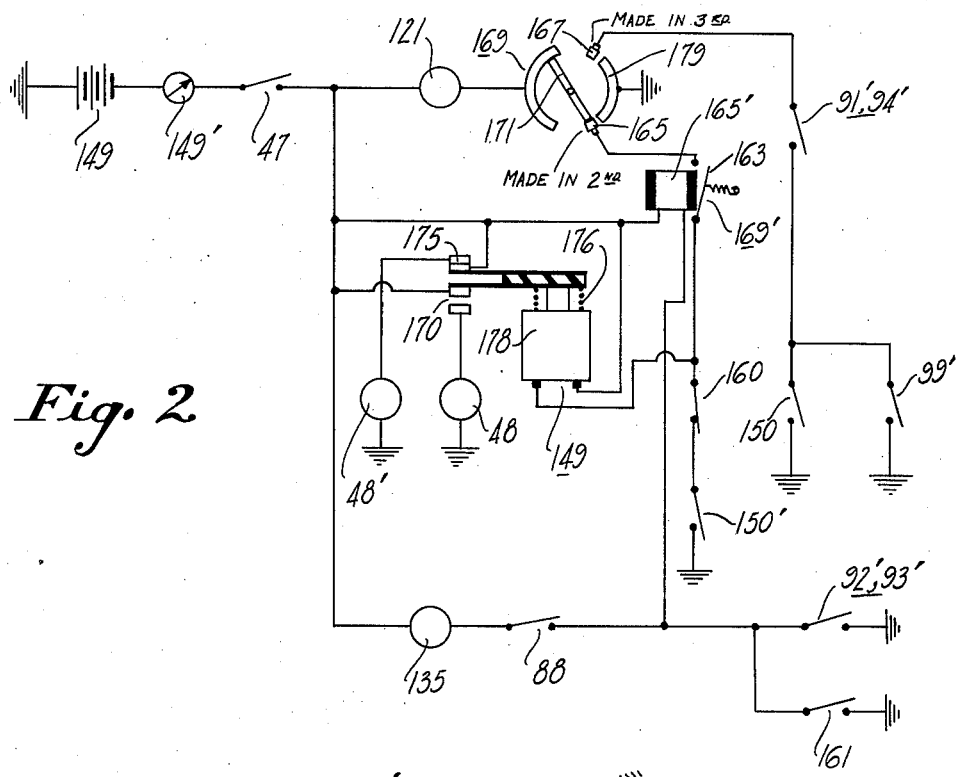
Figure 2 is a wiring diagram of the electrical mechanism disclosed in Figure 1.

The electrical means for controlling the operation of the solenoids 48, 48', 121 and 135 constitutes one of the most important features of my invention, a preferred embodiment of said electrical means being disclosed in Figures 1 and 2. This mechanism, in addition to the aforementioned motor operated selector switch mechanism 169, the manually operated selector switch 47, the second gear overrule switch 87' the accelerator operated switches 91', 94' and 92', 93', the clutch motor operated switch 88 and the relay 169', includes a relay 149 for controlling the valve 45' and a vehicle speed responsive governor operated switch mechanism 143, Figure 11. The latter switch mechanism includes a high speed switch 150, comprising a movable contact 147 and fixed contacts 157 and 144, and a low speed switch 150', comprising the movable contact 147 and fixed contacts 159 and 153. As is disclosed in Figures 1 and 11 fixed contacts 157 and 159 are grounded and the contacts 144 and 153 are electrically connected respectively to the accelerator operated switch 91', 94' and to a normally closed switch 160 of the second gear overrule switch 87'.

The latter switch also includes a grounded switch 161 for controlling the choke valve operating solenoid 135 said switch being electrically connected in parallel with the accelerator operated switch 92', 93.

The multi-switch selector switch mechanism 169, which is operated by the transmission operating motor 40, includes a casing 179 upon which are mounted a fixed contact 165, a grounded fixed contact 179, the aforementioned fixed contact 167, and a movable contact 171 the latter being actuated by a link 173 connected to the transmission operating crank 14. The fixed contact 165 is wired to the switch 163 of the relay 169' and the movable contact 171 is wired to the solenoid 121. The parts of the mechanism are shown in their second gear position in Figures 1 and 2 of the drawings; and in this position the switch mechanism 169 is prepared for a subsequent high gear operation of the mechanism the contact 171 being moved into contact with the contact 165. It will also be apparent from an inspection of Figure 2 that when the transmission is established in its high gear setting the switch mechanism 169 is set for a subsequent second gear operation of the mechanism.

As is disclosed in Figure 2 the relay 149 includes a normally open switch 170 and a normally closed switch 175 the latter being biased to its closed position by a spring 176. The coil 178 of the relay is electrically connected in series with a grounded battery 149, the ignition switch 149' of the ignition system of the vehicle, the selector switch 47, the switch 160 of the second gear overrule switch mechanism 87' and the grounded governor operated switch 150'.

Figure 13:
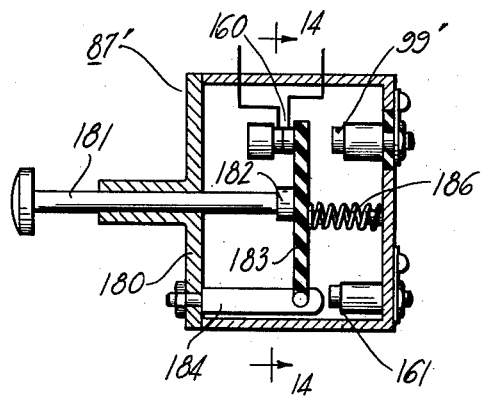
Figure 13 is a sectional view disclosing details of the second gear overrule switch mechanism of the embodiment of my invention disclosed in Figure 2.
Figure 14:
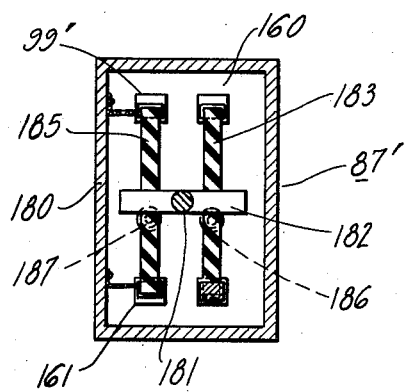
Figure 14 is a sectional view, taken on the line 14—14 of Figure 13, disclosing other details of the second gear overrule switch mechanism of Figure 2.

Referring to Figures 13 and 14 the second gear overrule switch mechanism 87' preferably includes a casing 180 the cap portion of which is provided with an opening to slidably receive a spring and manually operated plunger 181; and the lower end of the latter contacts a thrust bar 182. The bar 182 rests upon a switch operating member 183 said member being pivotally connected at one of its ends to a support member 184 secured to the casing 180; and at its other end the member 183 serves as a mounting for the movable contact of the switch 160. The bar 182 also rests upon a switch operating member 185 which serves as a mounting for the movable contacts of the switches 99' and 161. Completing the description of the switch mechanism 87' the fixed contacts of the switches 99' and 161 are grounded to the casing 180; and as disclosed in Figure 13, springs 186 and 187 serve respectively to bias the switch operating members 183 and 185 to a position to close the switch 160 and open the switches 99' and 161.

There is thus provided an effective and relatively simple electrical mechanism for controlling the operation of the motors 32 and 40 to alternately place the transmission in its second gear settings, the clutch and throttle being operated to facilitate said operations of the transmission; and said mechanism may also be operated, at the will of the driver, to effect a second gear setting of the transmission at any speed of the vehicle. With the selector switch 47 closed to effect the power operation of the mechanism, the governor switch mechanism 143 then takes over the control in cooperation with the motor operated switch 169. The governor switch 143 having initiated an operation of the mechanism the motors 32 and 40 are then energized the transmission being operated after the clutch is disengaged; for the gear teeth of the transmission may not be demeshed until after the torque is reversed, that is, until after the engine is disconnected from the transmission. The switch 171, 179 of the switch mechanism 169 insures a completion of the transmission operating operation of the motor 40 once initiated; the mechanism of Figures 3 and 4 operates to effect the desired acceleration of the vehicle after the operation of the transmission is completed; and the inclusion of the switch 87' in the electrical mechanism makes it possible for the driver at any time to overrule the governor switch 143 to establish and maintain the transmission in its second gear setting irrespective of the speed of the vehicle.

Describing now the complete operation of the mechanism of my invention, and incidentally completing the description of the parts of said mechanism not heretofore described, it will be assumed that the three speeds forward and reverse transmission 10 is neutralized and that the car is at a standstill with the engine idling, thereby making of the intake manifold of said engine a source of vacuum. The driver will then probably wish to establish the transmission in its low gear setting whereupon he will first manually depress the clutch pedal 38 to disengage the clutch and will then operate the shift lever 52' to manually effect said setting. The accelerator will then be depressed as the clutch is re-engaged to get the car under way; and after the desired car speed is reached, the shift lever and clutch pedal are again operated to establish the transmission in its second gear setting. The car being then under way in second gear at the desired speed, the driver will probably wish to be relieved of the operation of the transmission and clutch; accordingly, to effect this result he will manually disengage the clutch and then move the shift lever to its automatic position, that is, one of the six selective positions of said lever. Describing the latter operation the shift lever 52, which at the time is in its second gear setting, is rotated downwardly, that is, angularly in a clockwise direction in a plane perpendicular to the plane of the steering wheel; and this operation serves to bodily move the shaft 32 downwardly to close the switch 47. This operation also serves as a declutching operation of the clutch mechanism 42', the clutch member 52' moving away from the clutch member 44', the movement of the latter being prevented by the stop 68'.

Figure 8:
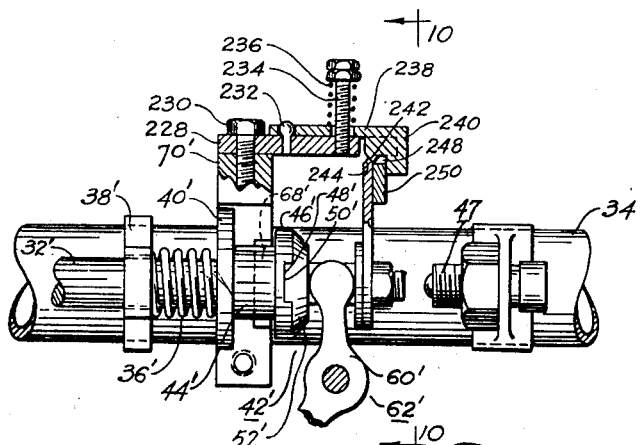
Figure 8 is an enlarged view of the mechanism at the base of the steering column, said mechanism serving to disconnect the shift lever from the power operated transmission operating linkage.
Figure 9:
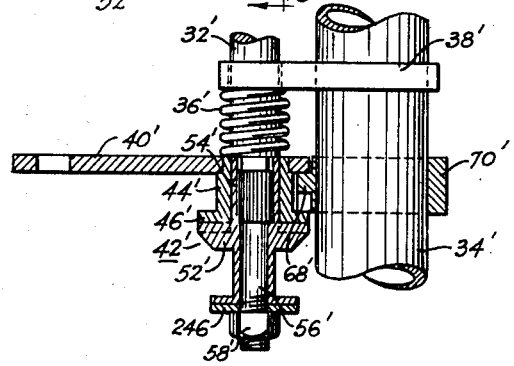
Figure 9 is a sectional view, taken on the line 9—9 of Figure 10, disclosing certain features of the mechanism disclosed in Figure 8.
Figure 10:
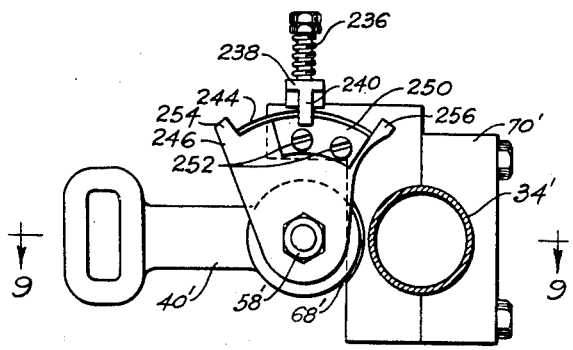
Figure 10 is a front view, taken on the line 10—10 of Figure 8, of the mechanism disclosed in Figure 8.

Referring to Figures 8 and 10 there is disclosed a latch mechanism for holding the shift lever in its automatic position, said mechanism including a relatively narrow rectangular shaped support member 228 preferably detachably secured to the bracket member 70' by a bolt 230; and there is mounted on said support member, by means of a guide pin 232, a bolt 234 and a spring 236, a movable latch member 238 shaped at its outer end to provide a relatively narrow stop member 240. Now when the shift lever 52 is moved to its automatic position a relatively narrow wedge-shaped flange portion 242 of the member 238 is rocked and/or bodily lifted, against the tension of the spring 236, by the camming action of a wedge-shaped peripheral edge portion 244 of a stop member 246 which is secured to the pin 56', Figure 9, between the lower flange portion of the clutch member 52' and the nut 58'; and this operation serves to position said peripheral edge portion 244 in the space indicated by the reference numeral 248, Figure 8. Incidentally, the shift rail selecting mechanism of the transmission and the cooperating transmission parts are so constructed that the crank 62' may be moved beyond its second and high shift rail selective position in effecting the above described automatic setting of the shift lever.

Now at this juncture it is to be noted, from an inspection of Figure 10, that a rectangular shaped stop member 250, secured to the outer face of the stop member 246 by screws 252, is in contact with the member 240 when the parts are in their transmission neutral position and when the spring 36' has operated to move the crank 12 to its second and high shift rail position, that is, the position preparing the transmission for either second or high gear operation. It follows therefore that the stop member 246 must be rotated clockwise in Figure 10 so that the member 250 will clear the member 240 before the shift lever may be moved downwardly to its automatic position, that is, the position to close the switch 47; and it becomes apparent from the above description that the parts of the mechanism are so constructed and arranged that this automatic setting of the shift lever may only be effected after said shift lever has been moved to establish the transmission in its second gear setting. Referring to Figure 10 of the drawings in this position of the parts, that is the second gear setting, a stop 254 on the member 246 will contact the side of the members 228 and 238 and the stop member 250 will be positioned to the right of the member 240. Completing the description of the member 246 a stop 256 is provided thereon to contact one side of the members 228 and 238 when the shift lever is moved to either its low or high gear position.

Figure 11:
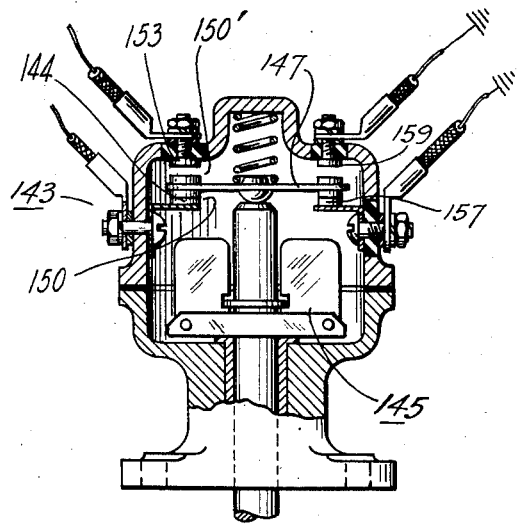
Figure 11 is a view disclosing details of the governor operated switch of the mechanism of my invention.

Continuing the description of the operation of the mechanism, the driver having moved the shift lever to its automatic position and assuming that the car is traveling above governor speed to close the switch 147, 153, 159, Figures 2 and 11, the transmission will then be automatically established in its high gear setting after the driver releases the accelerator to close the switch 92', 93'; for with this operation an electrical circuit is completed through the coil 165' of the relay 169'. The relay switch 163 is thus closed thereby completing an electrical circuit to energize the solenoid 121. As is disclosed in Figure 2 this circuit includes the then closed switch 165, 171 of the selector switch 169, and the normally closed switch 160 of the second gear overrule switch mechanism 87'. With this operation of the governor switch 143 an electrical circuit is also completed to effect an energization of the relay 149 thereby effecting an energization of the solenoid 48; and this operation effects an operation of the valve 49, 50 resulting in a high gear operation of the motor 40. The concurrent energization of the solenoid 121 results in an opening of the valve 99; and this operation effects an energization of the motor 32, the piston 31 of the said motor being then subjected to a differential of pressures to move the same to the left, Figures 1 and 5. The right side of the piston 31 is at all times subjected to the pressure of the atmosphere via screened openings 31' in one end of the motor 32; and the left side of said piston, that is, the side constituting a wall of the compartment 111, is subjected to a relatively low gaseous pressure when the three-way valve 99 is opened to interconnect said compartment with the intake manifold or other source of vacuum. When the latter valve is closed, that is, when the solenoid 121 is de-energized, the compartment 111 is vented to the atmosphere through said valve and the spring 59 within said compartment is then operative to move the piston 31 to the right, Figure 1, to permit a re-engagement of the friction clutch by the operation of its springs.

Describing now the clutch disengaging and throttle controlling operation of the motor 32, the above referred to leftward movement of the piston 31 serves to rotate the crank 20 to disengage the clutch and rotate the cam 77 counterclockwise to bring the stop portion A, B of said cam opposite the accelerator operated crank 74. Now the motor 40 is at the time energized accordingly immediately after the clutch plates are moved out of contact with each other to reverse the driving torque the above described force transmitting means interconnecting the piston 42 and the crank 14 becomes operative to move said crank and establish the transmission in its high gear setting; and as this operation of the transmission is being completed the transmission switch 169 is operated to make the switch 165, 171 and to break the switch 171, 179. The switch 167, 171 is broken during the first increment of movement of the piston 31; and the switch 171, 179 insures a completion of the high gear transmission operating operation of the motor 32 once initiated and despite a certain operation of the governor operated switch 143 which breaks the electrical circuit during said operation. The latter operation of the switch 143 is effected if the car brakes are suddenly applied to bring the car down below governor speed as the motor 40 is operating to establish the high gear setting of the transmission. If this unusual operation of the mechanism is effected then the driver, in order to effect a re-engagement of the clutch after the transmission is established in high gear, must depress the accelerator to open the switch 91', 94', after the switch 167, 171 is closed. Now the breaking of the switch 91', 94' results in a de-energization of the solenoid 121 and as described above this results in a de-energization of the motors 40 and 32 the operation of the latter motor initiating a controlled opening of the throttle.

The transmission will now remain in its high gear setting until the accelerator is again released whereupon the motors 32 and 40 will again be energized to establish the transmission in its second gear setting and to operate the clutch and throttle to facilitate said operation. If the car is then brought to a stop without neutralizing the transmission, that is, leaving the shift lever in its automatic setting, the operation of the fluid coupling of the power plant will obviate a stalling of the engine despite the relatively high gear ratio setting of the transmission, that is, its second gear setting, and despite the fact that the idling engine is at the time directly connected to the then stationary propeller shaft of the vehicle.

Referring now to the most important feature of my invention the driver may, when the vehicle is traveling above governor speed, that is, the speed effecting a closing of the switch 150', overrule the operation of said switch to establish the transmission in its second gear setting and maintain this setting. This operation is effected by first releasing the accelerator to close the switch 91', 94' and then moving the plunger 181, Figure 13, inwardly to close the switches 99' and 161 and open the switch 160 of the second gear overrule switch mechanism 87'. The latter mechanism is preferably mounted in the instrument panel of the driver's compartment of the vehicle.

Now as will be noted from an inspection of Figure 2 of the drawings the grounded governor switch 150 is wired in parallel with the grounded switch 99' accordingly a closing of the latter switch will, provided the remainder of the electrical circiut is closed, serve to complete the electrical circuit to effect an energization of the solenoid 121 despite the fact that the speed of the vehicle is such as to keep the switch 150 open. The closing of the switch 99' and the concurrent opening of the switch 160 results in an operation of the motors 32 and 40 to effect a second gear operation of the transmission, this operation being facilitated by an operation of the clutch and throttle; and the concurrent closing of the switch 161 insures a desired stage clutch engaging operation of the motor 32 despite an opening of the accelerator operated switch 92', 93' said operation being effected at the relatively high vehicle speed at which the above discussed second gear overrule operation of the transmission is normally effected. The opening of the switch 160 serves to break the circuit including the relay switch 163 thereby making it impossible, so long as the switch 160 is kept open, to effect a high gear setting of the transmission. There is thus provided means for maintaining the second gear overrule setting of the transmission said setting being maintained until the driver opens the switches 99' and 161 and closes the switch 160 by pulling the plunger 181 outwardly, Figure 13.

Figure 15:
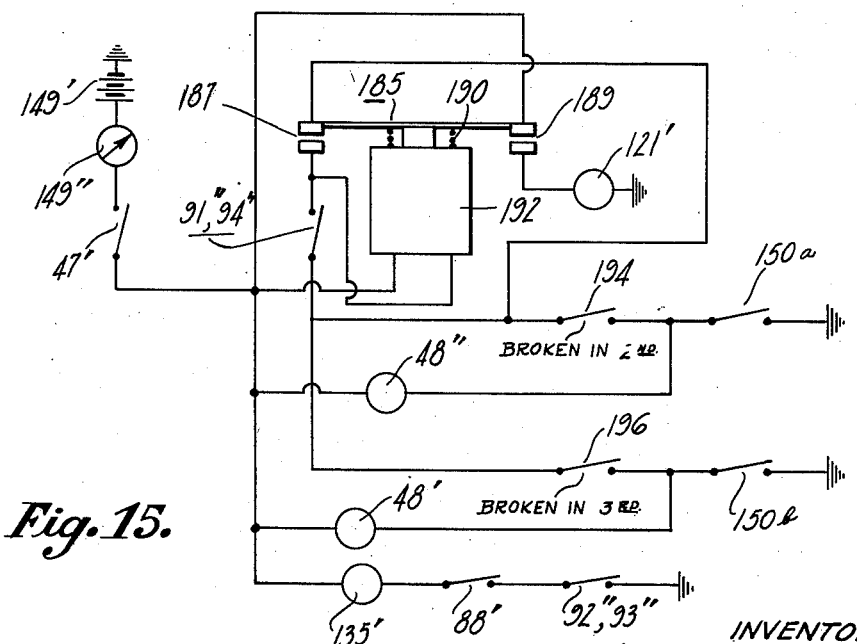
Figure 15 is a wiring diagram of the electrical control system of another embodiment of my invention.

There is disclosed in Figure 15 another embodiment of my invention including governor, motor, an accelerator operated switch mechanism for controlling the operation of the clutch and throttle operating motor 32 and the transmission operating motor 40. Parts of the mechanism of Figure 15 which are duplicates of parts of the mechanism of Figures 1 and 2 are given the same reference numerals given to duplicate parts in the latter figures with the addition of a prime or in some cases a double prime; however the governor operated switch 150 of Figure 2 is identified as switch 150a in Figure 15 and the governor operated switch 150' of Figure 2 is identified as switch 150b in Figure 15. These duplicate parts include the accelerator operated switch mechanism, the solenoids for operating the control valves of the motor 40, the governor operated switch mechanism, the clutch control choke valve and solenoid for operating said valve, and the three way valve operating solenoid of the clutch and throttle operating motor 32.

The principal feature of the electrical control mechanism of Figure 15 lies in the provision of a relay 185 operative to insure an energization of the motors 32 and 40 until the setting of the transmission has been completed or substantially completed and despite an opening of an accelerator operated switch 91", 94" as said operation is being effected. This relay mechanism includes switches 187 and 189 for controlling the second gear solenoid 48" and the third gear solenoid 48' respectively of the transmission operating motor said switches being biased to their open position by a spring 190 and closed by the energization of a relay coil 192. As disclosed in Figure 15 when the accelerator and governor operated switches 91", 94" and 150a are closed to effect a second gear setting of the transmission then the coil 192 of the relay 185 is energized thereby closing the switches 187 and 189; and the switch 187 then remains closed until a switch 194 is opened, which operation is effected when the operation of establishing the transmission in second gear is completed or substantially completed. As to the third gear operation of the mechanism the switch 189 once closed remains closed until a switch 196 is opened which operation is effected when the operation of establishing the transmission in high gear is completed or substantially completed.

Figure 16:
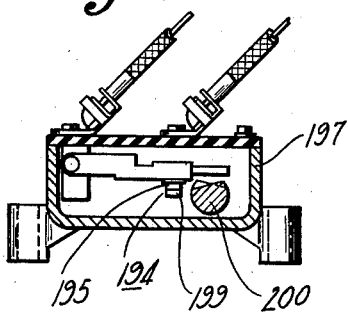
Figure 16 is a sectional view disclosing details of the motor operated breaker switch mechanism of the embodiment of my invention disclosed in Figure 15.
Figure 17:
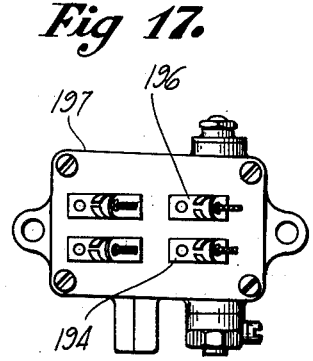
Figure 17 is a plan view of the switch mechanism disclosed in Figure 16.

The switches 194 and 196 are disclosed in detail in Figures 16 and 17 and are housed within a casing 197. These switches are duplicates of each other the switch 194 being disclosed in Figure 16. This switch includes a movable contact 198 and a fixed contact 199 the movable contacts of both switches 194 and 196 being actuated, to open the switches, by a cam shaft 200 which is rotated by a crank, not shown; and this crank is operatively connected to the transmission operated crank 14, Figure 1.

There is thus provided, by the mechanism of Figure 15, means for insuring a completion of the operation of the transmission once initiated and despite an opening of the accelerator operated switch 91", 94" as said operation is being carried out.

Figure 18:
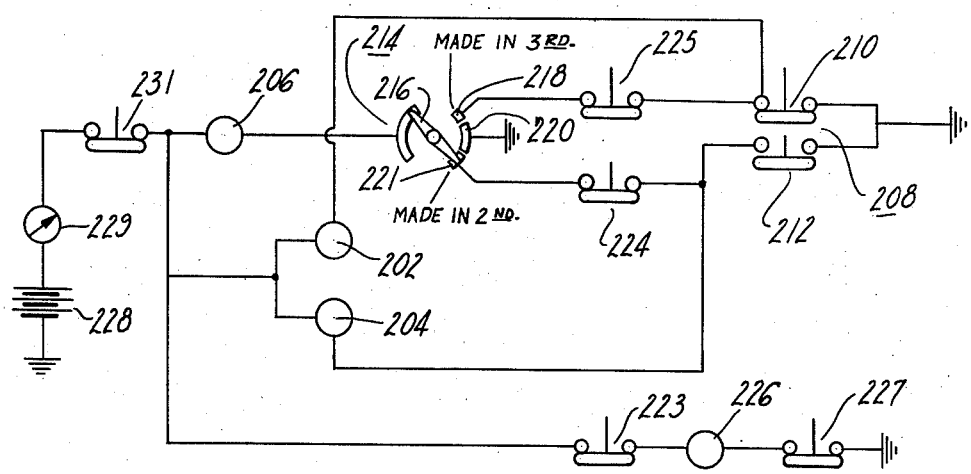
Figure 18 is a wiring diagram of the electrical mechanism of another embodiment of my invention.

There is disclosed in Figure 18 another embodiment of electrical means for controlling the motors 32 and 40 of my invention. In this embodiment the transmission operating motor 40 is controlled by a second gear solenoid 202 duplicating the solenoid 48' of Figure 1 and a third gear solenoid 204 duplicating the solenoid 48 of said figure; and the clutch and throttle operating motor 32 is controlled by a three way valve operating solenoid 206 which duplicates the solenoid 121 of Figure 1. As with the mechanism of Figures 2 and 15 the control compartment 111 of the motor 40 of the mechanism of Figure 18, is in fluid transmitting connection with the motor 32; accordingly an energization of the latter motor makes possible an energization of the motor 40.

The electrical means for controlling the solenoid 206 includes a governor operated switch mechanism 208 duplicating in construction the switch 143 of Figure 11 said switch 208 comprising a low speed switch 210 and a high speed switch 212. The electrical means for controlling the solenoid 206 also includes a selector switch mechanism 214 operated by the motor 40 said switch mechanism duplicating the selector switch mechanism 169 of Figure 2. This mechanism includes a movable contact 216 and fixed contacts 218, 220, and 221 providing three switches. The electrical controls for the motor 32 also include a three part accelerator operated switch mechanism similar to the breaker switch mechanism disclosed in Figure 12. This switch mechanism includes three separate switches 223, 224 and 225 all of which are biased by spring means to an open position and closed when the accelerator is released; and as with the mechanism of Figures 2 and 15 the clutch and throttle operating motor 32 of the mechanism of Figure 18 is controlled by a choke valve operating solenoid 226 and a switch 227. A grounded battery 228, the ignition switch 229, and a manually operated selector switch 231 duplicating the switch 47 of Figure 1 complete the electrical controls of Figure 18.

Briefly describing the operation of the controls of Figure 18 when the driver closes the selector switch 231 and releases the accelerator to close the switches 223, 224, and 225 then the governor operated switch mechanism 208, the motor operated selector switch 214 and the controls 226 and 227 take over the control of the motors 32 and 40 of my invention. Assuming that the governor switch 208 is operative to close the switch 210 to effect a second gear operation of the three speeds forward and reverse transmission then the solenoids 206 and 202 are simultaneously energized to effect said operation; and a subsequent operation of the governor switch to close the switch 212 will effect an energization of the solenoids 206 and 204 to establish the transmission in its high gear setting. As with the controls of the mechanisms of Figures 2 and 15 the operation of the transmission is completed once initiated; and the operation of the controls of Figures 3 and 4 of the mechanism cooperate with the remainder of the mechanism to effect the desired acceleration of the vehicle after a setting of the transmission has been completed.

There is thus provided a simple, effective and efficient manually and power operated mechanism for operating the transmission, clutch and throttle of an automotive vehicle; and the clutch pedal, the shift lever and the accelerator constitute the only manually operated controls of said mechanism. With the mechanism of my invention the driver may manually operate the clutch and the three speeds forward and reverse transmission in a convention manner, that is, by operating the clutch pedal and by effecting the H movement of the shift lever; then if he desires an automatic operation of the transmission to alternately establish the same in its second and high gear settings he has only to move the shift lever from its second gear setting to its automatic setting. Thereafter for all normal straight ahead driving of the vehicle the driver need only operate the accelerator.

Although only three embodiments of the invention have been illustrated and described, various changes in the form and relative arrangements of the parts may be made to suit requirements.

Having thus described the various features of the invention, what I claim as new and desire to secure by Letters Patent is:

1. In an automotive vehicle provided with a power plant including a throttle valve, a change speed transmission, and a friction clutch; means for operating the transmission including power means for alternately establishing the same in first one and then the other of two of its settings and for operating the throttle and clutch to facilitate said power operation of the transmission, said power means including a single acting fluid pressure motor operably connected to the throttle and clutch and operative to disengage the clutch and at the same time maintain the throttle closed, said power means further including a double acting motor operably connected to the transmission and operative to establish the same in one or the other of the aforementioned settings after the clutch is disengaged, and means for controlling the operation of said motors including a vehicle speed responsive governor and switch means operated by said governor for initiating the two operations of the double acting motor and the operation of the single acting motor depending upon the speed of the vehicle.

2. In an automotive vehicle provided with a power plant including a throttle valve, a change speed transmission, and a friction clutch; means for effecting an operation of the transmission including power means for alternately establishing the same in first one and then the other in two of its settings and for operating the throttle and clutch to facilitate said power operation of the transmission, said power means including a single acting fluid pressure motor operably connected to the throttle and clutch and operative to maintain the throttle closed as the clutch is being disengaged, a double acting fluid pressure operated motor operably connected to the transmission; and means for controlling the operation of said motors to effect the aforementioned operations of the throttle, clutch, and transmission including a vehicle speed responsive governor and switch means operable by the governor and operative to initiate the operation of the control means.

3. In an automotive vehicle provided with a power plant including an engine controlling throttle valve, a change speed transmission, and a friction clutch; means for operating the transmission including power means for alternately establishing the same in first one and then the other of two of its settings and for operating the throttle and clutch to facilitate said power operation of the transmission, the operation of the clutch being effected in a cycle of operations, said power means including a single acting fluid pressure motor operably connected to the throttle and clutch and operative to maintain the throttle closed as the clutch is being disengaged, fluid transmitting means interconnecting the latter motor and intake manifold, a double acting fluid pressure operated motor operably connected to the transmission, fluid transmitting means, including a control valve, interconnecting the latter motor with the aforementioned motor, and means for controlling the operation of both of said motors including a master three-way valve for controlling the passage of power fluid through the first mentioned fluid transmitting means.

4. In an automotive vehicle provided with a three speeds forward and reverse transmission, a throttle, and a friction clutch; transmission, clutch and throttle operating power means including means for operating the throttle and clutch to facilitate the operation of the transmission, said throttle, clutch, and transmission operating power means comprising a clutch and throttle operating motor and a transmission operating motor, operable, in a cycle of operations, to alternately establish the transmission in first one and then the other of two of its settings, the throttle and clutch being operated to facilitate the operation of the transmission; and electrical means for controlling the operation of the power means including a plurality of solenoids for controlling the operation of the transmission operating motor, means, including a relay mechanism, for controlling the operation of said solenoids, a solenoid for controlling the operation of the clutch and throttle operating motor, means, including another relay mechanism, for controlling the operation of the latter solenoid, and governor operated switch means for controlling the operation of the entire electrical means.

5. Power means, operative in a cycle of operations, for alternately establishing a change speed transmission in first one and then the other of two settings and for operating a clutch to facilitate said operations, including a single acting fluid pressure motor adapted to be connected to a clutch, a double acting fluid pressure motor adapted to be connected to a transmission, said motors serving to effect a disengagement of the clutch and an operation of the transmission followed by a reengagement of the clutch, valve means for controlling the operation of said motors, and means for controlling the operation of said valve means to effect the aforementioned cycle of operations of the mechanism including a solenoid for actuating the valve means which controls the single acting motor, two solenoids for controlling the valve means which control the double acting motor, and electrical means for controlling the operation of all of said solenoids including a motor operated selector switch mechanism operative to preselect one or the other of two electrical circuits to be used in the control of the first mentioned solenoid and also operative to insure an operation of the latter solenoid once the operation of the single acting motor is initiated, said solenoid controlling electrical means further including a relay mechanism for controlling the solenoids which control the double acting motor; together with a governor operated switch mechanism operative to control both the latter solenoids and the first mentioned solenoid.

6. Power means, operative in a cycle of operations, for alternately establishing a change speed transmission in first one and then the other of two settings and for operating a clutch to facilitate said operations, including a single acting fluid pressure motor adapted to be connected to a clutch, a double acting fluid pressure motor adapted to be connected to a transmission, said motors serving to effect first a disengagement of the clutch and an operation of the transmission followed by a reengagement of the clutch; valve means for controlling the operation of said motors, and means for controlling the operation of said valve means to effect the aforementioned cycle of operations of the mechanism including a solenoid for actuating the valve means which controls the single acting motor, two solenoids for controlling the valve means which control the double acting motor, and electrical means for controlling the operation of all of said solenoids including a motor operated selector switch mechanism operative to preselect one or the other of two electrical circuits used in the control of the first mentioned solenoid and also operative to insure an operation of the latter solenoid, once the operation of the single acting motor is initiated, and further including means for controlling the selected circuit comprising a governor operated switch mechanism; said solenoid controlling electrical means further including a relay mechanism, controlled in part by the governor operated switch mechanism, for controlling the solenoids which control the double acting motor; together with a plurality of manually operated switches, operative, when the transmission is established in one of the aforementioned two settings, to overrule the governor operated switch mechanism and effect an operation of the mechanism to establish the transmission in the other of the aforemention two settings.

7. Power means, operative in a cycle of operations, to alternately establish a change speed transmission in first one and then the other of two settings and to operate a friction clutch to facilitate said operations, said power means including a single acting fluid pressure motor adapted to be connected to a friction clutch, a double acting fluid pressure motor adapted to be connected to a change speed transmission, valve means, including a master three-way valve for controlling the operation of both motors and a double three-way valve for controlling the operation of the double acting motor, for controlling the operation of said motors, and means for controlling the operation of said valve means including a plurality of solenoids, a selector switch mechanism operated by the double acting motor and operative to make possible a successive energization and deenergization of one of said solenoids to thereby successively effect an energization and deenergization of the single acting motor, said valve controlling means further including switch means, including a governor operated switch mechanism and manually operated switch mechanism, cooperating with the selector switch mechanism to effect the control of the valve means.

8. Power means, operative in a cycle of operations, to alternately establish a change speed transmission in first one and then the other of two settings and to operate a friction clutch to facilitate said operations, said power means including a single acting fluid pressure motor adapted to be connected to a friction clutch, a double acting fluid pressure motor adapted to be connected to a change speed transmission, valve means, including a master three-way valve for controlling the operation of both motors and a double three-way valve for controlling the operation of the double acting motor, for controlling the operation of said motors; and means for controlling the operation of said valve means including a plurality of solenoids, a selector switch mechanism operated by the double acting motor and operative to make possible a successive energization and deenergization of one of said solenoids to thereby successively effect an energization and deenergization of the single acting motor, said valve controlling means further including switch means, including a governor operated switch mechanism and manually operated switch mechanism, cooperating with the selector switch mechanism to effect the control of the valve means; and manually operated switch means for overruling the operation of the governor operated switch mechanism to effect a second gear operation of the power means, said overruling operation being effected when the governor operated switch mechanism is established in a certain setting.

9. In an automotive vehicle power plant including an accelerator, a change speed transmission, a vehicle speed responsive governor, and a clutch; power means, operative in a cycle of operations, for alternately establishing the transmission in first one and then the other of two settings and for operating the clutch to facilitate said transmission operations, said power means including a single acting fluid pressure motor operably connected to the clutch, a double acting fluid pressure motor operably connected to the transmission, valve means for controlling the operation of said motors including a master three way valve for controlling the operation of both of said motors and a double three way valve for controlling the operation of the double acting motor; and electrical means for controlling the operation of said valve means including a solenoid for controlling the operation of the master three way valve, two solenoids for controlling the operation of the double three day valve, and means for controlling the operation of all of said solenoids including switch mechanism operated by the aforementioned governor and further including a switch mechanism operated by the accelerator.

10. In a power plant including an accelerator, a change speed transmission and a clutch; power means, operative in a cycle of operations, for alternately establishing the transmission in first one and then the other of two settings and for operating the clutch to facilitate said transmission operations, including a single acting fluid pressure motor operably connected to the clutch, a double acting fluid pressure motor operably connected to the transmission, valve means for controlling the operation of said motors including a master three way valve for controlling the operation of both of said motors and a double three way valve for controlling the operation of the double acting motor; and electrical means for controlling the operation of said valve means including a solenoid for controlling the operation of the master three way valve, two solenoids for controlling the operation of the double three way valve, and means for controlling the operation of said solenoids including a vehicle speed responsive governor, two switches operated by said governor, a plurality of switches operated by the accelerator and serving as part of the means for controlling the master three way valve operating solenoid, a selector switch mechanism, including three switches, operated by the double acting motor, one of said three switches, one of the accelerator operated switches and one of the governor operated switches being electrically connected in series with the aforementioned three way valve controlling solenoid, and another of said three switches of the selector switch mechanism being electrically connected in series with the three way valve controlling solenoid, the other of the accelerator operated switches and the other of the two governor operated switches; an electrical conductor electrically connecting one of the governor operated switches with one of the two solenoids which control the double acting motor, and an electrical conductor directly connecting the other of the governor operated switches with the other of the two solenoids which control the double acting motor.

11. In a power plant including an accelerator, a change speed transmission and a clutch; power means, operative in a cycle of operations, for alternately establishing the transmission in first one and then the other of two settings and for operating the clutch to facilitate said transmission operations, including a single acting fluid pressure motor operably connected to the clutch, a double acting fluid pressure motor operably connected to the transmission, valve means for controlling the operation of said motors including a master three way valve for controlling the operation of both of said motors and a double three way valve for controlling the operation of the double acting motor; and electrical means for controlling the operation of said valve means including a solenoid for controlling the operation of the master three way valve, two solenoids for controlling the operation of the double three way valve, and means for controlling the operation of said solenoids including a vehicle speed responsive governor, two switches operated by said governor, a relay mechanism including a coil and two switches one of which is electrically connected to the three way valve controlling solenoid and the other of which is electrically connected to both of the aforementioned governor operated switches, an accelerator operated switch electrically connected to the coil and to both of the two governor operated switches, electrical means directly connecting one of the governor operated switches with one of the two solenoids for controlling the double three way valve, and electrical means directly connecting the other of the two double three way valve controlling solenoids with the other of the governor operated switches.

RICHARD H. LONG.

REFERENCES CITED

The following references are of record in the file of this patent:

UNITED STATES PATENTS

| Number | Name | Date |
|---|---|---|
| 1,911,599 | Bloxsom | May 30, 1933 |
| 2,234,463 | Brewer | Mar. 11, 1941 |
| 2,287,272 | Price et al. | June 23, 1942 |
| 2,322,411 | Barkeij | June 22, 1943 |
| 2,397,883 | Peterson et al. | Apr. 2, 1946 |
| 2,487,482 | Schotz | Nov. 8, 1949 |
| 2,492,923 | Moore et al. | Dec. 27, 1949 |